Inventors
DAVID E. RIGALL
DANIEL EATON
By
Attorney

Inventors
DAVID E. RIGALL
DANIEL EATON

Feb. 2, 1971  D. E. RIGALL ET AL  3,560,951
SWITCH FOR SIGNALLING VIBRATIONS AND WHEEL BALANCE
TESTER INCORPORATING SAME
Filed Dec. 11, 1968  3 Sheets-Sheet 3

Inventors
DAVID E. RIGALL
DANIEL EATON

By *Jerome A. Gross*

Attorney

United States Patent Office 3,560,951
Patented Feb. 2, 1971

3,560,951
SWITCH FOR SIGNALLING VIBRATIONS AND WHEEL BALANCE TESTER INCORPORATING SAME
David E. Rigall, Pontiac, Mich., and Daniel Eaton, Wentzville, Mo., assignors to The Metalife Company, Wentzville, Mo., a corporation of Missouri
Filed Dec. 11, 1968, Ser. No. 783,080
Int. Cl. G08b 19/00, 21/00
U.S. Cl. 340—261
10 Claims

ABSTRACT OF THE DISCLOSURE

A switch signals small amplitude vibrations of a mechanical element movable over a much greater range. A magnet element of the switch grasps a slide surface of the movable mechanical element to vibrate with it within closely confined limits, but if the mechanical element moves through a greater amplitude, it slides relative to the magnet switch element. As applied to apparatus for detecting the unbalance of the vehicle wheels, the magnet switch element slidably grasps onto the side surface of a spring-suspended shaft which may be depressed to fit against the under side of a vehicle at any convenient height.

BACKGROUND OF THE INVENTION

This invention relates to the detection and the signalling of mechanical vibrations of small amplitude, and has special application to detecting the unbalance of vehicle wheels.

In many types of apparatus, mechanical systems elements subject to vibrations are or should be movable over a large range of movement; yet this movement range is inconsistent with the attachment of vibration-sensing equipment. In some instances, range of movement has been sacrificed in favor of sensing the vibrations.

For example, in the invention of Schnoebelen, U.S. Pat. No. 2,565,577 for a Switch for Static and Dynamic Balancing of vehicle wheels, vibrations induced at the upper end of a spring-suspended vertical shaft are sensed by a switch at its lower end. This apparatus will not function unless the point of the vehicle at which the vibrations are sensed is at a precisely fixed height. This is a serious disadvantage, inasmuch as it is desirable to place such a vibrating sensing apparatus under the axle or other wheel-support member of the vehicle when jacked up to same roughly convenient height. Furthermore, should the jack slip, the weight of the vehicle would be imposed on the delicate switch mechanism.

Static unbalance of a vehicle wheel may roughly be considered as the unbalance of masses taken along a circular line, without regard to whether they lie in a plane; whereas dynamic unbalance may be roughly considered as the departure from planarity of such circle of masses. The Schnoebelen patent discloses the operating principles that static unbalance of a rotating wheel will impose a vibration which tends to lift the vehicle on each rotation of the wheel, and which may be sensed by the vertical vibrations of a spring-suspended shaft in contact with the vehicle adjacent to its wheel. A stroboscopic light, discharged by each vibration, may be used to reveal the angular position at which the lifting occurs. The Schnoebelen patent also discloses that dynamic vibrations may be detected by angular vibrations of such a suspended shaft, utilized somewhat similarly to discharge a stroboscopic light.

SUMMARY OF THE INVENTION

Magnet switch means, sufficiently delicate to sense small vibrations, include a magnet switch element, confined within close limits, which grasps slidably onto a slide surface of the mechanical system element which is permitted a wide range of movement along a defined path. Such confinement is achieved by a fixed position electrical contact and by abutment means opposed thereto. All vibrations of the mechanical system element whose amplitude equals the limit of confied movement will open and close a signalling circuit. However, movements by the mechanical system element of greater amplitude than limits so provided will cause the magnet switch element to adjust and re-adjust its position along the slide surface of the mechanical element.

As applied to apparatus to signal the unbalance of vehicle wheels, a housing includes vertical bushing means which define an axis of movement of a steel shaft, suspended by a spring, whose upwardly projecting ends sense vibrations of the vehicle. The spring provides an axial length over which the shaft is depressible; and a slide surface, of at least that length, is provided along one side of the shaft within the housing. A magnet switch element slidably grasps this slide surface; it is confined within narrow fixed limits preferably as small as the amplitude of vibrations desired to be sensed, and in any event much less than the length over which the shaft is depressible. On movements of the shaft greater than the limits which confine the magnet switch element, it will slide and re-position itself along the slide surface. As it vibrates on the shaft within the fixed limits it actuates electric signalling means. In the preferred embodiment, to be described, one of the limits is an electrical contact, on each cyclic movement of the magnet switch element away from this electrical contact a stroboscopic light is discharged; this served to indicate the angular position at which the unbalanced wheel is exerting the force which triggers the light; and a balance weight may be added to the wheel at a position 180° removed therefrom.

Since greater unbalance will cause vibrations of greater amplitude, the preferred embodiment utilizes a plurality of fixed magnets, provided in vertical alignment along the shaft; and a magnetic pick-up alongside the path in which the magnets travel when the shaft is vibrated. The magnitude of current generated is a function of the extent of unbalance; and is used to indicate how much weight is to be added.

The same slidable magnet switch element, connected in a separate switch circuit, utilizes regular vibrations of the shaft to ascertain whether the wheel possesses any serious dynamic unbalance.

DESCRIPTION OF THE PREFERRED EMBODIMENT

Figure 1:
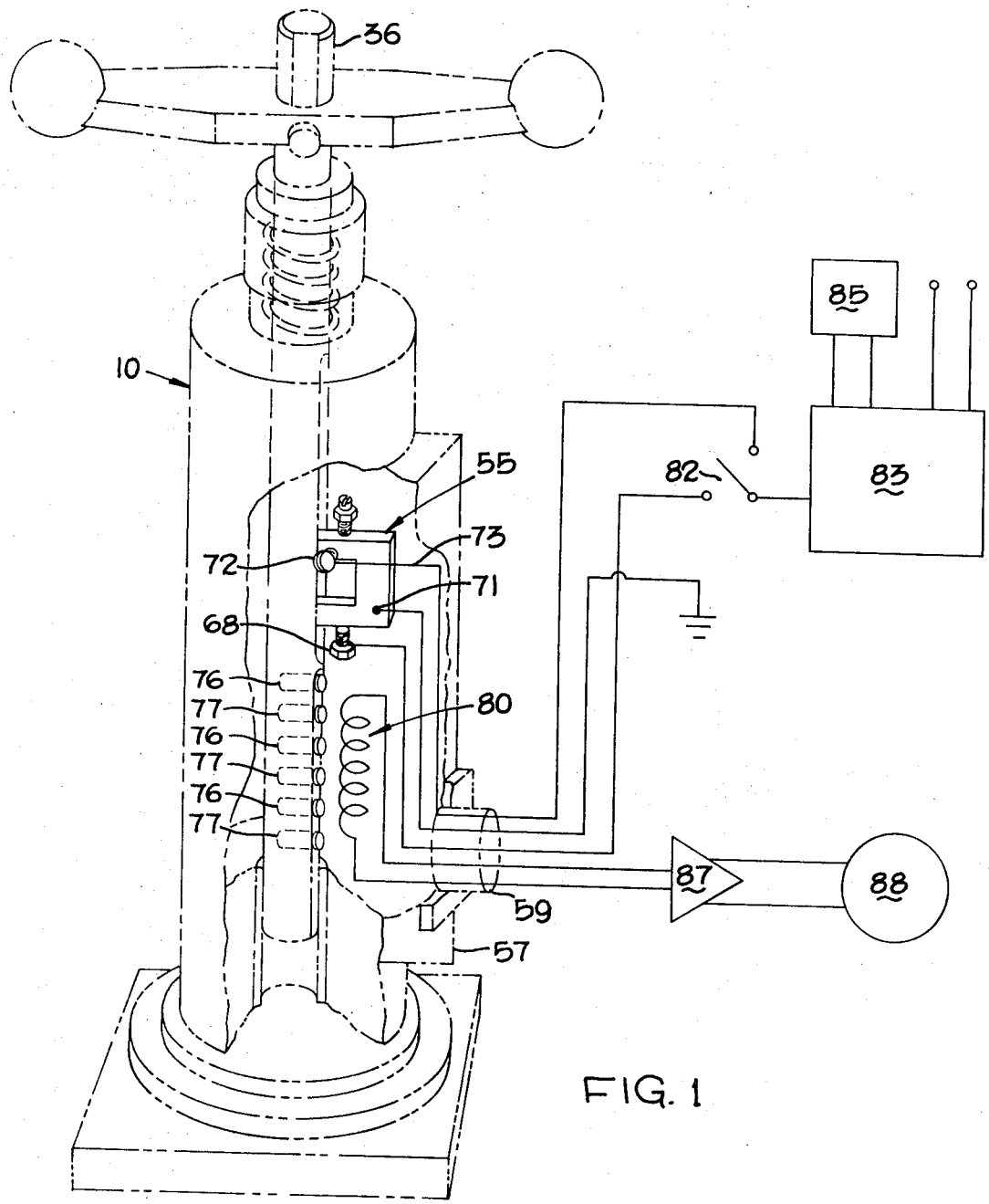
FIG. 1 is a schematic illustration of a wheel balance test apparatus incorporating the present invention, including circuitry connecting the magnet switch element and pulse generator thereof to a stroboscopic light and an ammeter. The dashed lines indicate schematically certain structure shown more fully in FIG. 2.

The concept of a mechanical system capable of movements of larger amplitude than the amplitude of vibrations to be signalled, is exemplified by the apparatus for testing the balance of vehicle wheels, as shown in FIG. 1.

Figure 2:
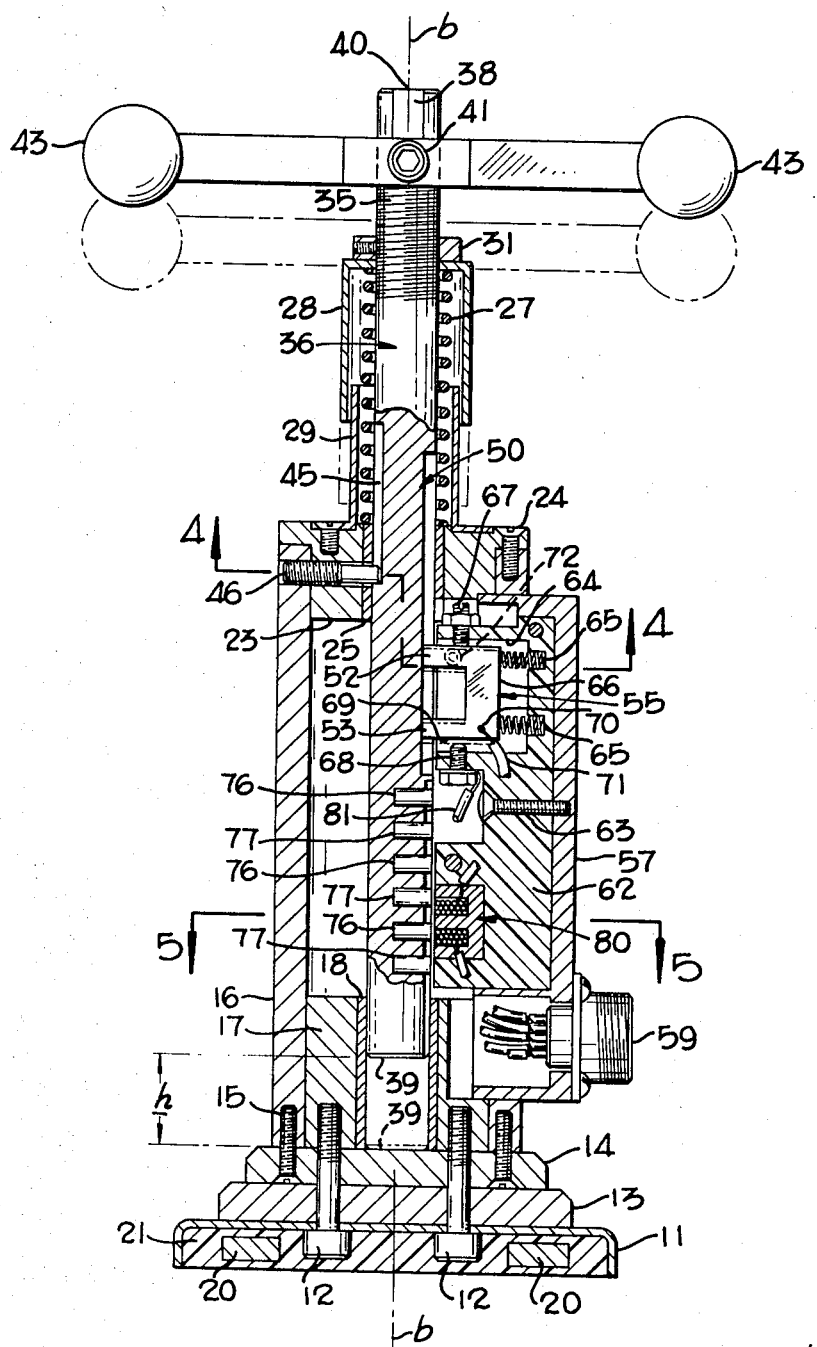
FIG. 2 is a detailed view in vertical section of the wheel balance test apparatus of FIG. 1 without said associated circuitry.
Figure 3:
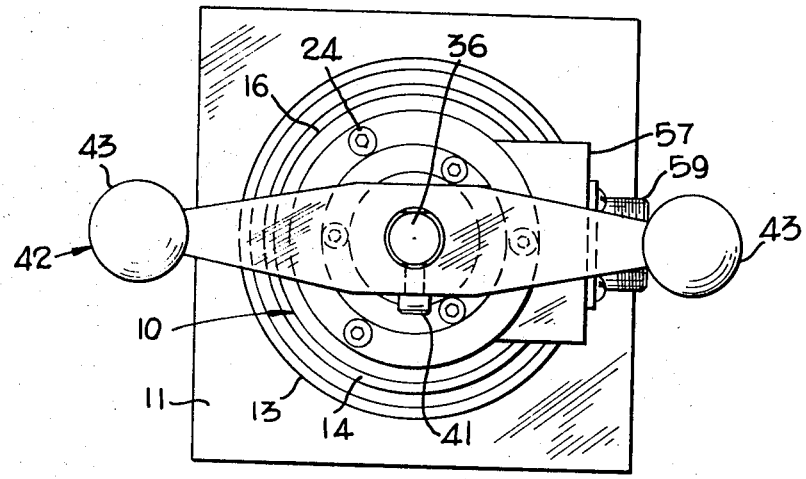
FIG. 3 is a plan view of the apparatus of FIG. 2.

The preferred mechanical elements to be utilized are best shown in FIG. 2, which will now be described in detail. A housing generally designated 10 includes a squared, downward-flanged metal base plate 11 through which project a plurality of principal mounting screws 12. These extend upward through bores in first and second pedestal plates 13, 14, the second plate 14 being further bored to receive a plurality of smaller upward-extending mounting screws 15 which retain the lower end of a housing cylinder element 16, one side of which is cut away, as hereinafter described. Within the housing cylinder element 16, retained by the screws 12, is a lower annular spacer element 17 which secures a lower vertical bushing 18 concentric with a central axis b—b. For retaining the housing 10 in position on a ferrous metal surface, magnets 20 are embedded in a plastic fill 21 in the under side of the flanged metal base plate 11.

An upper annular spacer element 23, mounted by screws 24 into the upper edge of the housing cylinder element 16, secures an upper bushing 25 in alignment with the lower bushing 18 along the axis b—b. A compression spring 27, mounted atop the bushing 25 and enclosed by upper and lower telescopic cylindrical casings 28, 29, supports the upper casing 28 and an adjusting nut 31, mounted on the upper threaded end 35 of a shaft, generally designated 36, which passes slidably through the bushings 18, 25.

The shaft 36 may be formed of steel or other ferrous metal, or if preferred, any other material capable of attracting a magnet. The compression spring 27 suspends the shaft 36 elastically for movement along the shaft axis b—b and provides it an amplitude of vertical movement many times larger than the amplitude of vertical vibrations to be signalled in the course of testing a wheel for unbalance. The lower and upper bushings 18, 25 define a path for movements of the shaft 36.

Above the threaded portion 35, the shaft 36 has a flat face 38 extending to its upwardly-projecting vibration-sensing end 40. Fitted over the end 40, and secured to the face 38 by a screw 41, is a rigid fly-ball vibrator element generally designated 42, whose weighty ball elements 43 add mass to amplify angular vibrations of the shaft 36, as hereinafter mentioned. A retention keyway 45, on one side of the shaft 36 and extending below the bottom of the compression spring 27 when the shaft 36 is pressed somewhat downward, is engaged by a retention screw 46 through the upper side wall of the housing cylinder 16; thus, in the solid line position shown in FIG. 2 the spring 27 will be slightly compressed. The dashed line position shows the shaft 36 moved through its depressible length $h$ down to its extreme lowermost position, so that its bottom end 39 abuts against the second pedestal plate 14. Such extreme lowering may occur, without damage to the apparatus whenever excess weight is imposed on the upper shaft end 40, as for example if the supporting jack beneath a vehicle axle is inadvertently lowered while the apparatus is in place.

Within the side of the shaft 36 opposite to the retention keyway 45, but extending for a substantially greater length, is a slide surface generally designated 50, similar in contour to a square cut keyway. Within the keyway-like slide surface 50 fit the upper and lower legs 52, 53 of a C-shaped magnet switch element generally designated 55. In the preferred embodiment of invention, the switch element 55 is a permanent magnet, retained in vibration-permitting position adjacent to the path of movement of the slide surface 50 of the shaft 36. By its magnetism, the magnet switch element 55 grasps and adheres to the slide surface 50 for purpose of small amplitude vibrations; but abutments, above and below it, to be described, require it to release its magnetic grasp sufficiently to permit the shaft 36 to undergo movements of larger amplitude. To permit these movements, the length of the keyway-like slide surface 50 exceeds the height of the magnet switch element 55 by at least the depressible length $h$ of the shaft 36, illustrated in FIG. 2. Likewise the length of the retention keyway 45 exceeds the depressible length $h$ of the shaft 36 by at least the diameter of the retention screw 46.

Figure 4:
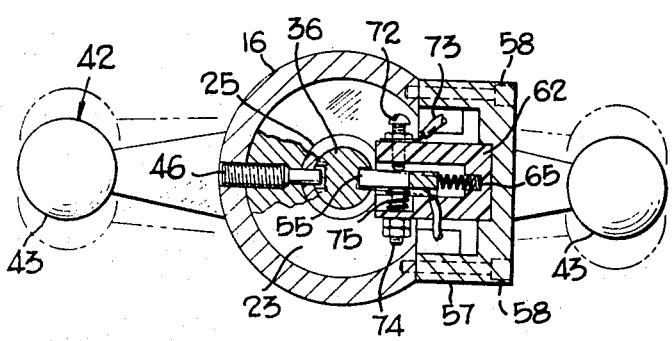
FIG. 4 is a sectional view taken along line 4—4 of FIG. 2.
Figure 5:
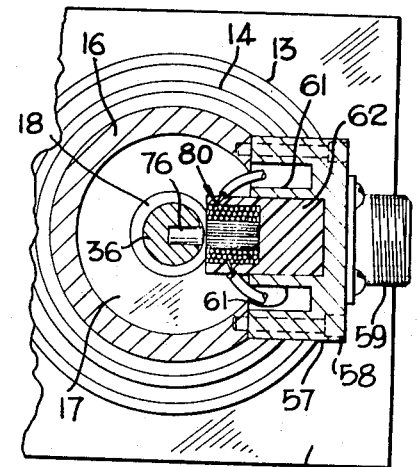
FIG. 5 is a fragmentary sectional view taken along line 5—5 of FIG. 2.

As shown in FIGS. 2, 4 and 5, the housing cylinder element 16 is cut away, on the side of the shaft 36 corresponding to the slide surface 50, to receive a rectangular housing element 57 retained by screws 58, through which all the electrical connections are made by a conventional multiple connector 59. The rectangular housing element 57 is preferably made as a casting having vertical spacing fins 61 between which is mounted an insulating support block 62 retained by a screw 63 shown in FIG. 1. The support block 62 mounts numerous elements, now to be described.

Seated in an upper recess 64 in the insulating block 62, a pair of compression springs 65 press radially inward against the outer side surface 66 of the magnet switch element, to avoid the possibility of its displacement from the slide surface 50. Above the upper leg 52, an adjustable abutment screw 67 limits the upward movement of the magnet switch element 55; whereas, beneath the lower leg 53 a fixed position electrical contact post 68 limits the downward movement of the magnet switch element 55 and on contact with it makes a circuit, through any electrical contact means carried by the magnet switch element 55. The contact post 68 is connected by an electrical connector 81 to one contact of a double throw switch 82. In the simple embodiment illustrated, such electrical contact means is merely the lower or base surface portion 69 of the magnet switch element 55 itself. An electrical connector 70 mounted at a connecting point 71 to the lower side surface of the magnet switch element 55 thus makes a circuit connection through the electrically conductive magnet switch element 55 to the lower contact post 68 when the magnet switch element 55 rests thereagainst. This circuit connection is broken by those vibrations of the shaft 36 which raise the magnet switch element 55. Breaking this circuit connection actuates conventional signalling means, which in the preferred embodiment includes a stroboscopic light 85, as hereinafter described.

For detecting angular vibrations of the shaft 36, circuit is made through the connecting point 71 to a second fixed position contact post 72, to which a connector 73 is attached, leading to the second throw contact of the switch 82. The post 72 limits angular movement, in one sense of the rotation, of the shaft 36, and makes a circuit-making connection with second electrical contact means carried by the magnet switch element 55; in this embodiment, such contact means is merely a part of the side surface of the magnet switch element 55 itself. Such connection is broken by angular vibrations of the shaft 36. On the side opposite, the head of a sliding screw 74, urged by a spring 75 biased against the support block 62, serves as an angular abutment to confine the angular movement of the magnet switch element 55 in opposition to the post 72. Breaking this circuit serves to actuate the same signalling means.

Within the portion of the shaft 36 beneath the lower end of the slide surface 50 and above the bottom end 39 of the shaft 36 are magnetic field-creating means carried upward and downward by the vertical movements of the shaft 36. In the embodiment illustrated, such magnetic field-creating means consists of a pluality of small fixed magnets. The first, third, and fifth of these magnets, numbered 76, have corresponding poles presented outwardly; the alternate magnets 77 have the opposite poles so presented. Magnetic pick-up means generally designated 80 is supported in the insulating support block 62 closely adjacent to the outward projecting poles of the magnets 76, 77. Regardless how much the shaft 36 may be depressed, some of the magnets 76, 77 will be sufficiently close to the pick-up 80 that small amplitude vibrations of the shaft 36 will generate a current whose magnitude is the function of the amplitude of vibration.

FIG. 1 discloses a conventional circuitry suitable for operating the apparatus whose details are shown in FIGS. 2-5. For detecting static unbalance, the circuitry functions as follows: The operator throws a double throw switch 82 to connect the lead to the fixed position contact post 68 beneath the magnet switch element 55, which in closed position rests on the post 68. Thus a circuit is made through the magnet switch element 55 and its connecting point 71, to ground. Current is supplied to the switch 82 through conventional transistorized triggering circuitry generally designated 83. When vertical vibrations of the shaft 36 raise the magnet switch element 55 to break the circuit, a change in bias of the transistorized triggering circuitry 83 is effected so as to discharge the condenser element of, or associated with, a stroboscopic light 85, and to flash it to illuminate the rotating wheel in its angular position at which the circuit is broken.

To detect dynamic unbalance, the operator throws the switch 82 to connect the lead to the second contact post 72 along side of the magnet switch element 55 which in normal position, is in contact with it. A similar discharge will occur on any angular vibration of the shaft 36 whenever and at the time the magnet switch element 55 breaks contact with the second contact post 72.

In determining the magnitude of weight to be added to correct static unbalance, the current generated by the full amplitude of vertical vibrations of the shaft 36 is measured. The movement, with the shaft 36, of the magnetic fields of the magnets 76, 77 adjacent to the pulse generator 80, generates a current which is amplified by the fixed gain amplifier 87 connected in circuit therewith; as so amplified, the current is sensed by and read at indicator means, such as a meter 88, connected thereto. For ease in use, the meter may be calibrated in the amounts of weight to be added.

The leads from the switch 82, from ground and from the amplifier 87 lead into the rectangular housing element 57 through the multiple connector 59, as indicated schematically in FIG. 1.

Use of the present apparatus is unique in that its depressible length $h$ permits it to be positioned easily and safely with the shaft sensing end 40 in contact with the vehicle adjacent to the wheel to be balanced. The principles of its use, however, in observing and correcting the static and dynamic unbalance of a wheel, are well known. The advantages of having the magnetic switch element 55, as well as the pulse generator 80, which operate independently of the position of the shaft 36 along the depressible length $h$, afford the described embodiment exceptional ease of utilization; also the accuracy of the present apparatus is not impaired by rough handling.

Other embodiments of this invention will suggest themselves, utilizing the unique operating principles herein disclosed, and most importantly the principle of a magnetic switch element which, confined within close limits, slidably adjusts its position along the slide surface of a mechanical element, capable of larger movements, which it grasps magnetically. Accordingly, this invention should be construed as fully commensurate with the scope of the claims which follow.

We claim:

1. For signalling vibrations in mechanical systems capable of movement whose amplitude is larger than the amplitude of the vibrations to be signalled, the combination with means defining a path for such movements, of
   switch means opening and closing by movement along a portion of such path, said switch means comprising
   a mechanical system element having a slide surface moving along such path, and having, along said slide surface, material capable of attracting a magnet,
   a magnet switch element adjacent to said path and slidably grasping said slide surface, whereby to move with the mechanical system element over a portion of such path,
   electrical contact means carried by said magnet switch element,
   electrical signalling means in a circuit connected to said magnet-carried contact means,
   fixed position electrical contact means to limit such movement of said magnet switch element and, on contact with said contact means carried by it, to make said circuit, and
   abutment means, opposed to said fixed position electrical contact means, to limit the distance of movement of the magnet switch element away from said fixed position contact means,
   whereby the magnet switch element will be confined between the fixed position electrical contact and said abutment means, and on movements by the mechanical element of greater amplitude than the said distance so limited, will be caused to slidably adjust its position along the slide surface of said mechanical element,
   thereby to respond, by making and breaking the signalling means circuit, to all vibrations whose amplitude equals said distance, regardless where they may occur along the path of movement of said mechnical system element.

2. The invention defined in claim 1, wherein
   the electrical contact means carried by the magnet switch element is a base surface portion of the magnet switch element itself.

3. For detecting the unbalance of vehicle wheels, apparatus to signal unbalance thereof, comprising the combination defined in claim 1, in which
   the mechanical system element is a shaft elastically suspended for movement along the shaft axis and having an upwardly projecting vibration-sensing end, and
   said slide surface is provided along the side of said shaft, and
   the means to define a path for the movements of said shaft including bushings vertically aligned in a housing.

4. Apparatus to signal unbalance of vehicle wheels as defined in claim 3, wherein
   the electrical signalling means includes a stroboscopic light and the circuit therefor includes means to trigger the discharge of such light on breaking the circuit by movement of the magnetic switch element away from said fixed position contact means,
   whereby, on positioning the vibration-sensing end of the suspended shaft against a portion of such vehicle adjacent to a wheel and causing such wheel to spin, cyclic flashes of the stroboscopic light reveal the angular position of such wheel, if statically unbalanced, when the shaft end senses a force component exerted by virtue of such unbalance substantially vertically away from the fixed position contact means.

5. Apparatus to signal unbalance of vehicle wheels as defined in claim 3, further having
   second electrical contact means carried by said magnet switch element to make contact on angular movement about the shaft axis,
   second fixed position electrical contact means to limit such angular movement,
   means, effective on contact of said second fixed contact means with said second contact means carried by the magnet switch element, to make a circuit with said electrical signalling means, and
   angular abutment means, opposed to said second electrical contact means, to confine between them the angular movement of the magnet switch element,
   thereby to respond, by making and breaking the signalling means circuit, to angular vibrations of the shaft about its axis.

6. Apparatus to signal unbalance of vehicle wheels as defined in claim 3, further having
   means to generate an electric current whose magnitude is a function of the amplitude of vertical vibrations of the shaft, and
   indicator means connected thereto.

7. Apparatus to signal unbalance of vehicle wheels as defined in claim 6, wherein said means to generate an electric current includes
   magnetic field-creating means carried vertically upward and downward by said shaft, and
   magnetic pickup means supported closely adjacent to said field-creating means.

8. Apparatus to signal the unbalance of vehicle wheels, comprising
   a housing including vertical bushing means defining an axis,
   a shaft formed of ferrous metal and having an upwardly projecting vibration-sensing end,
   spring means to suspend said shaft for reciprocating movement within said bushing,
   whereby to establish an axial length over which the shaft is depressible,
   a slide surface extending axially along the side of said shaft for a length at least equal to said depressible length,
   a magnet switch element slidably grasping said slide surface,
   means to establish a limit of vertical movement of said magnet switch element substantially less than said depressible length,
   whereby the magnet switch element will vibrate axially with the shaft within such limit of vertical movement and, on movements greater than said limit, will reposition itself along said slide surface,
   electric signalling means, and
   circuit means to cause such axial vibrations of the magnet switch element with the shaft to operate the signalling means.

9. An apparatus as defined in claim 8, together with
   a plurality of permanent magnets mounted along said shaft spacedly in vertical alignment with their opposite poled alternating and presented along one side of the shaft,
   said plurality of magnets extending vertically over a height equal to the greater part of said depressible length,
   electromagnetic pick up means fixedly mounted sidewardly adjacent to the alternating poles of said magnets,
   whereby vibrations of the shaft will generate a current regardless of the extent the shaft is depressed over said depressible length, and
   indicator means connected in circuit with the pick up means.

10. An apparatus as defined in claim 8, further having
    means to establish limits of angular movement of the magnet switch element attendant to angular vibrations of the shaft, and
    circuit means to cause such angular vibrations of the magnet switch element with the shaft to operate the signalling means.

References Cited

UNITED STATES PATENTS

| | | | |
|---|---|---|---|
| 2,565,577 | 8/1951 | Schnoebelen | 200—52 |
| 3,144,774 | 8/1964 | Bjorn | 340—261X |

THOMAS B. HABECKER, Primary Examiner

M. SLOBASKY, Assistant Examiner

U.S. Cl. X.R.

200—52, 61.45; 340—282